US011771240B2

(12) United States Patent
Lutz et al.

(10) Patent No.: US 11,771,240 B2
(45) Date of Patent: Oct. 3, 2023

(54) CONTAINMENT SYSTEM FOR THE DISPLAY OF ANIMALS

(71) Applicant: GloFish, LLC, Earth City, MO (US)

(72) Inventors: Thomas Lutz, Cedar Rapids, IA (US); Phillip C. Bartoszek, New Berlin, WI (US); Ernie Katris, Long Grove, IL (US)

(73) Assignee: GloFish, LLC, Earth City, MO (US)

( * ) Notice: Subject to any disclaimer, the term of this patent is extended or adjusted under 35 U.S.C. 154(b) by 0 days.

(21) Appl. No.: 16/656,066

(22) Filed: Oct. 17, 2019

(65) Prior Publication Data

US 2020/0121097 A1    Apr. 23, 2020

Related U.S. Application Data

(60) Provisional application No. 62/747,104, filed on Oct. 17, 2018.

(51) Int. Cl.
*A47F 5/00* (2006.01)
*A47F 7/00* (2006.01)
*A47F 3/00* (2006.01)
*A01K 63/00* (2017.01)

(52) U.S. Cl.
CPC .......... *A47F 5/0025* (2013.01); *A01K 63/003* (2013.01); *A47F 3/001* (2013.01); *A47F 7/00* (2013.01)

(58) Field of Classification Search
CPC . A47B 47/042; A47B 47/0041; A47B 47/025; A47B 47/0066; F16B 12/02; A01K 63/003; A47F 7/00; A47F 3/001; A47F 5/0025
See application file for complete search history.

(56) References Cited

U.S. PATENT DOCUMENTS

| | | | | |
|---|---|---|---|---|
| 3,774,575 A | * | 11/1973 | Patterson | A01K 63/003 119/245 |
| 4,112,853 A | * | 9/1978 | Tisbo | A47B 47/0008 108/159 |
| 4,265,501 A | * | 5/1981 | Halliburton | A47B 47/025 108/91 |
| 4,709,642 A | * | 12/1987 | Briosi | F16B 12/32 108/187 |

(Continued)

FOREIGN PATENT DOCUMENTS

DE    202010005347 U1 *  8/2010  .......... F21V 33/0012
WO    WO-2015057479 A1 *  4/2015  ............ B29C 48/16

*Primary Examiner* — Patrick D Hawn
(74) *Attorney, Agent, or Firm* — Merchant & Gould P.C.

(57) ABSTRACT

A modular shelving system includes a plurality of shelves, each shelf having a length and defining a first passage, a second passage, a first channel, and a second channel that each extend the full length of their respective shelf. The system also includes a plurality of bars, each bar defining a length and including a first bar opening at a first end and a second bar opening at a second end opposite the first end, and a plurality of connectors, each connector including at least two male portions, each male portion sized and shaped to be received in one of the first passage, the second passage, the first bar opening, and the second bar opening to interconnect each of the plurality of shelves and each of the plurality of bars.

13 Claims, 18 Drawing Sheets

(56) References Cited

U.S. PATENT DOCUMENTS

| | | | | |
|---|---|---|---|---|
| 4,800,821 | A * | 1/1989 | Nook | A47B 91/12 |
| | | | | 108/106 |
| 5,042,425 | A * | 8/1991 | Frost, Jr. | A01K 31/06 |
| | | | | 119/246 |
| 5,144,896 | A * | 9/1992 | Fortsch | A47B 21/06 |
| | | | | 108/26 |
| 5,197,409 | A * | 3/1993 | Hammond | A01K 63/003 |
| | | | | 119/245 |
| 5,365,886 | A * | 11/1994 | Frost, Jr. | A01K 63/003 |
| | | | | 119/267 |
| 5,413,070 | A * | 5/1995 | DeWalt | A01K 63/003 |
| | | | | 119/247 |
| 5,460,277 | A * | 10/1995 | Silva | A45C 5/00 |
| | | | | 211/4 |
| 5,626,084 | A * | 5/1997 | Kelly | A47B 96/02 |
| | | | | 108/23 |
| 5,678,706 | A * | 10/1997 | Husak | A47B 47/005 |
| | | | | 211/189 |
| 5,722,544 | A * | 3/1998 | Williams | A47B 87/008 |
| | | | | 108/107 |
| 5,813,738 | A * | 9/1998 | Cheng | F16B 12/14 |
| | | | | 312/257.1 |
| 6,267,064 | B1 * | 7/2001 | Ostertag | B01L 9/02 |
| | | | | 108/50.02 |
| 6,305,324 | B1 * | 10/2001 | Hallock | A01K 1/031 |
| | | | | 119/248 |
| 6,341,566 | B1 * | 1/2002 | Hwang | A47B 47/005 |
| | | | | 108/180 |
| 8,087,522 | B2 * | 1/2012 | Stafford | A47F 7/00 |
| | | | | 211/119.003 |
| 8,944,532 | B2 * | 2/2015 | Tontarelli | A47B 47/042 |
| | | | | 312/263 |
| 9,826,829 | B2 * | 11/2017 | Sitton | A47B 47/042 |
| 10,555,605 | B1 * | 2/2020 | Berger | A47B 47/047 |
| 10,743,524 | B2 * | 8/2020 | Lutz | A01K 63/003 |
| 2002/0171332 | A1 * | 11/2002 | Skov | F16B 12/02 |
| | | | | 312/107 |
| 2004/0144328 | A1 * | 7/2004 | Bonner | A01K 1/03 |
| | | | | 119/455 |
| 2005/0263473 | A1 * | 12/2005 | TenBrink | A47B 45/00 |
| | | | | 211/189 |
| 2014/0116346 | A1 * | 5/2014 | Lutz | A01K 63/003 |
| | | | | 119/269 |
| 2014/0174374 | A1 * | 6/2014 | Lari | A01K 63/003 |
| | | | | 119/245 |
| 2014/0251932 | A1 * | 9/2014 | Lutz | A01K 63/06 |
| | | | | 211/85.26 |
| 2015/0182038 | A1 * | 7/2015 | Wiemer | A47F 3/001 |
| | | | | 108/23 |
| 2015/0313359 | A1 * | 11/2015 | Bennie | A47B 47/025 |
| | | | | 211/135 |
| 2016/0029789 | A1 * | 2/2016 | Bonuccelli | A47B 96/028 |
| | | | | 211/42 |
| 2017/0370391 | A1 * | 12/2017 | Goelst | F16B 5/0036 |
| 2021/0301848 | A1 * | 9/2021 | Cavalcante De Albuquerque | F16B 5/02 |

* cited by examiner

CONTAINMENT SYSTEM FOR THE DISPLAY OF ANIMALS

TECHNICAL FIELD

The present disclosure is directed, in general, to a containment system for animals, and more specifically to an environmentally-controlled containment system for small animals.

BACKGROUND

The display and sale of tropical animals can be difficult as they thrive in unique environments. Sensitive animals often die or become sick when exposed to environmental conditions that are not ideal. In addition, storing and displaying animals in bulk can be problematic as the animals my kill one another or pass sickness and disease between one another.

SUMMARY

A modular shelving system includes a plurality of shelves, each shelf having a length and defining a first passage, a second passage, a first channel, and a second channel that each extend the full length of their respective shelf. The system also includes a plurality of bars, each bar defining a length and including a first bar opening at a first end and a second bar opening at a second end opposite the first end, and a plurality of connectors, each connector including at least two male portions, each male portion sized and shaped to be received in one of the first passage, the second passage, the first bar opening, and the second bar opening to interconnect each of the plurality of shelves and each of the plurality of bars.

In another construction, a modular shelving system includes a first shelf having a cross-sectional shape that extends from a first end to a second end to define a shelf length, the first shelf defining a top surface arranged to support an object and a bottom surface opposite the top surface. The cross-sectional shape defines a first passage fully enclosed along the shelf length and defining a first passage opening at the first end and a second passage opening at the second end, a second passage fully enclosed along the shelf length and defining a third passage opening at the first end and a fourth passage opening at the second end, a first channel extending along the shelf length and defining a first opening that faces the top surface, and a second channel extending along the shelf length and defining a second opening that faces the bottom surface, The system also includes a first lighting element positioned within one of the first channel and the second channel, a first connector including a first male portion and a second male portion, the first male portion positioned within the first passage opening, and a bar including a bar opening sized to receive the second male portion, the bar and the first connector cooperating to at least partially support the first shelf.

In another construction, a shelf for a modular shelving system includes an extruded body having a uniform cross-section throughout a shelf length, the extruded body defining a top surface arranged to support an object and a bottom surface. The extruded body includes a first passage fully enclosed along the shelf length and defining a first passage opening at the first end and a second passage opening at the second end, a second passage fully enclosed along the shelf length and defining a third passage opening at the first end and a fourth passage opening at the second end, a first channel extending along the shelf length and defining a first opening that faces the top surface, and a second channel extending along the shelf length and defining a second opening that faces the bottom surface. The extruded body also includes a first U-shaped channel and a second U-shaped channel each extending along the shelf length and positioned opposite one another to define a rear portion of the extruded body, a first hook-shaped channel extending along the shelf length and positioned adjacent the rear portion, and a second hook-shaped channel extending along the shelf length and positioned adjacent a front portion of the extruded body opposite the rear portion.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
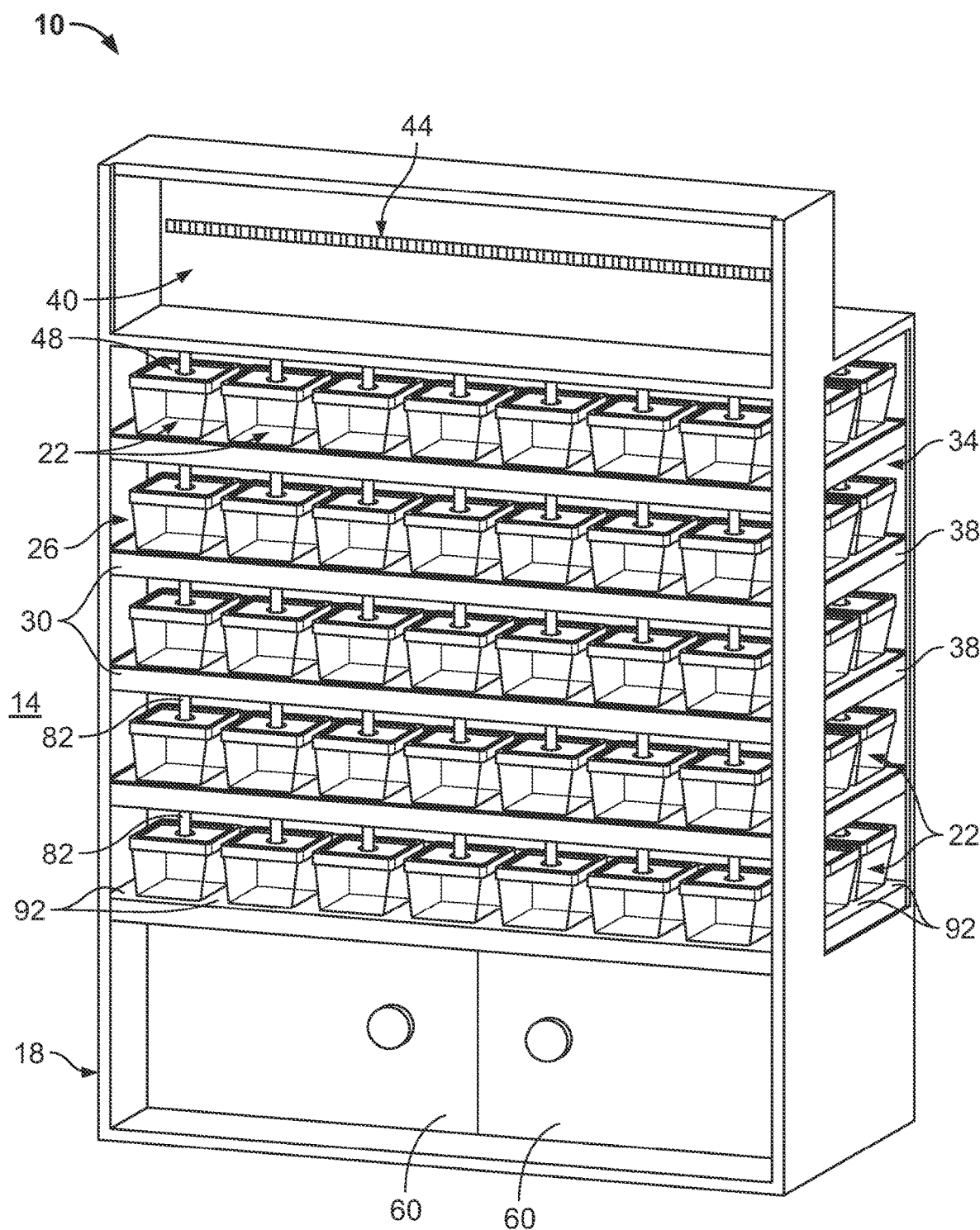
FIG. 1 is a front perspective view of a containment system according to one construction.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

Figure 2:
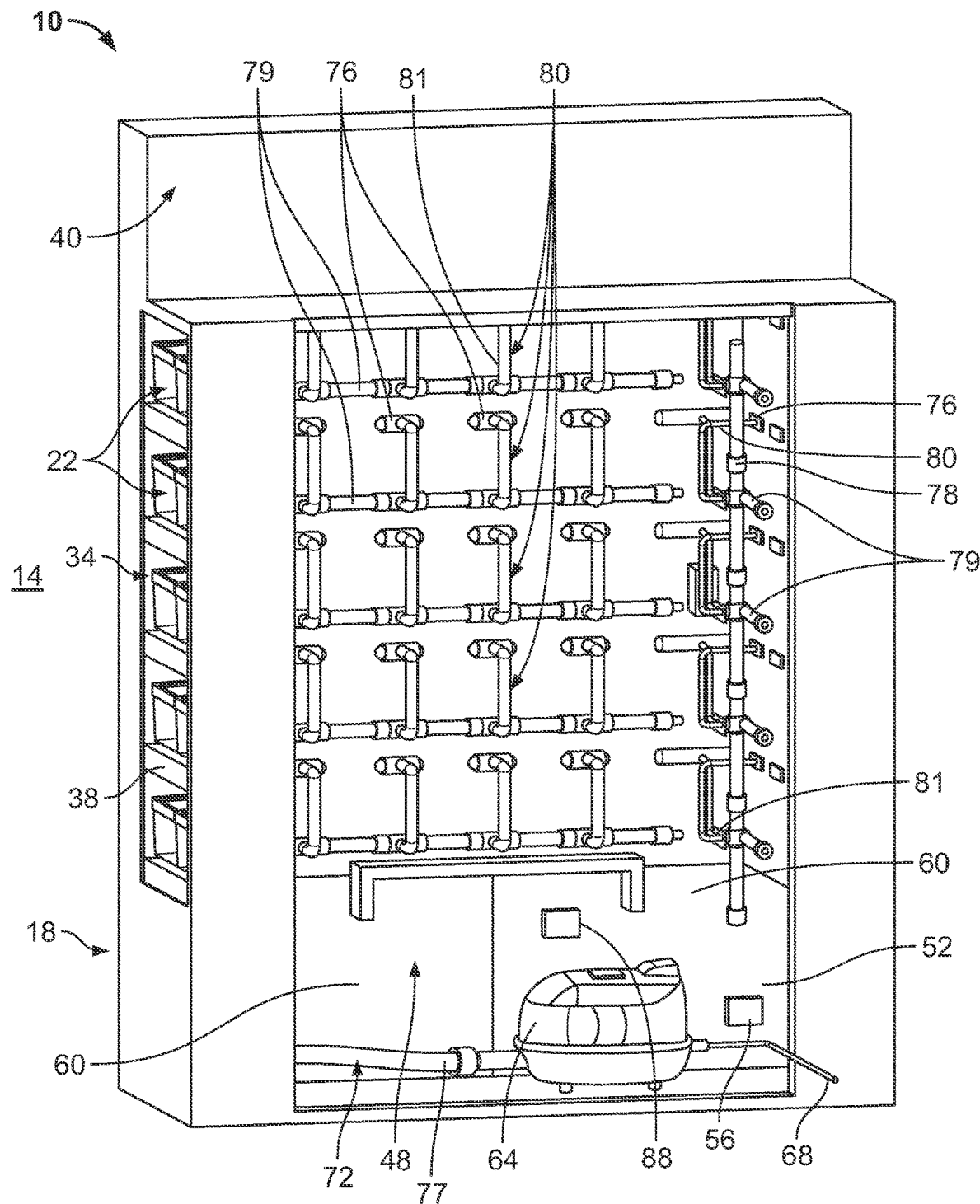
FIG. 2 is a back perspective view of the containment system of FIG. 1.

FIGS. 1 and 2 illustrate an animal containment system 10 for use as a fixture within a retail environment 14. The system 10 includes a base 18 that supports and positions a plurality of removable containment elements 22.

The base 18 includes a front facing portion 26 having a plurality of shelves 30 extending horizontally and parallel relative to one another. The base 18 further includes at least one side facing portion 34 having a plurality of shelves 38 extending horizontally and parallel relative to one another. The side-facing portion 34 extends perpendicular to the front facing portion 26. The shelves 30, 38 support the containment elements 22, and the front and side facing portions 26, 34 provide customer access and viewing of the containment elements 22 at various angles within the retail environment 14. The base 18 further includes a display area 40 at a top of the base 18 for signs, labels, etc. that are back-lit by a light source 44 (illustrated in FIG. 1).

With continued reference to FIGS. 1 and 2, each of the containment elements 22 is a cup sized and shaped to hold an isolated volume of water, along with a salable number of aquatic animals (i.e., a number of a particular animal typically purchased by a consumer). For example, Betta fish are typically purchased with one fish in each container, with other species of fish being able to share a container. However, the salable size is typically not broken up or divided for sales. While the illustrated animals in FIGS. 1-13 are Betta fish, the system 10 may be used for many aquatic species, and is not intended to be limited to small volume removable animal containment elements 22. In some constructions, for example, the system 10 is scaled to larger volumes, and includes containment elements 22 that contain one to ten or more fish of various size.

With continued reference to FIGS. 1 and 2, the base 18 includes an air distribution system 48 that supports the animals within the containment elements 22. A portion of the air distribution system 48 is hidden behind the front facing portion 26 and housed in a lower compartment 52 (illustrated in FIG. 2). The lower compartment 52 also houses other electrical equipment 56 (e.g., LED power supplies, transformers etc., illustrated schematically in FIG. 2) to support the system 10. To service the air distribution system 48 and the other electrical equipment 56, access doors 60 are incorporated into the base 18 in front of the compartment 52.

With continued reference to FIGS. 1 and 2, the air distribution system 48 includes an air pump (or compressor) powered by a power supply 68, and a set of conduits 72 coupled to the air pump 64 that extend through openings 76 to the front facing portion 26 and side portions 34 to deliver air from the air pump 64 to each of the containment elements 22.

As illustrated in FIG. 2, the set of conduits 72 includes a main manifold 77 coupled to the pump 64 to receive a flow of compressed air from the pump 64. The main manifold 77 is operable to direct a separate shelf flow of air to each shelf 30, 38 through a plurality of vertical manifolds 78 and horizontal shelf manifolds 79, each of the shelf manifolds 79 being positioned adjacent one of the shelves 30, 38. The shelf manifolds 79 are operable to receive the shelf flow of air from the main manifold 77, and to direct the air through a plurality of tubes 80 each having a first end 81 connected to one of the shelf manifolds 78 and a second, outlet end 82 selectively engageable with the top of one of the removable containment elements 22.

The conduits 72 are sized, tapered, and stepped down in diameter from the air pump 64 to the containment elements 22 to provide uniform air distribution flow rates at all of the outlet ends 82, independent of distance from the air pump 64.

Figure 3:
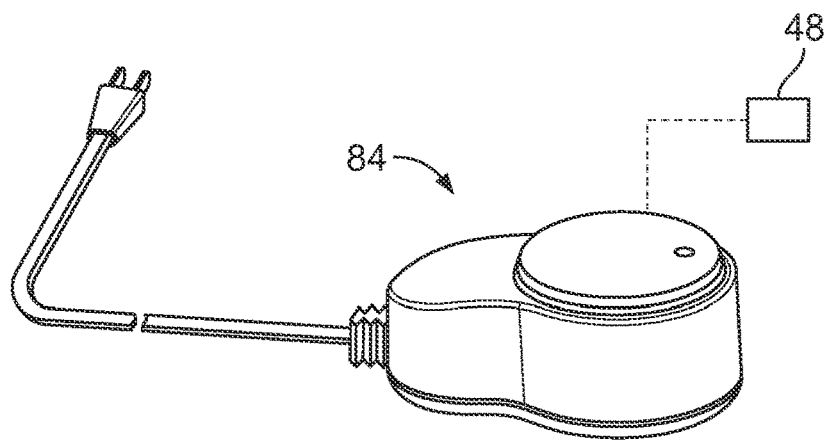
FIG. 3 is a perspective view of an air modulator for the containment system.

With reference to FIG. 3, the system 10 also includes an air modulator 84 (e.g., a rheostat) coupled to the air distribution system 48 to modulate and provide coarse adjustment of air flow moving through tubing 72 to each containment element 22. Because the air distribution system 48 is designed such that all of the outlet ends 82 have similar air flow rates, a course adjustment to the entire system 48 with the modulator 84 effectively controls airflow for the entire system 48. In some constructions a local restrictor is also, or alternatively, provided at each outlet end 82 to allow for individual air control at each outlet end 82.

A higher airflow rate, with a higher percentage of "on" time for the air distribution system 48, results in higher amounts of evaporation within each of the containment elements 22. Thus, with certain species of animal, evaporation rates in the containment elements 22 are reduced by managing the time that air is flowing through the air distribution system 48. In particular, and with reference to FIG. 2, a timer 88 (illustrated schematically) is provided to control the flow of air from the air pump 64 through the tubing 72. The timer 88 sets the flow of air moving through the tubing 72 on a cycle (e.g., a daily cycle with twelve hours on and twelve hours off, or an hourly cycle with forty minute on and twenty minutes off, etc.) to optimize the conditions within the containment elements 22 for a particular species of animal (certain species of animals benefitting from lower or no air flow for a period of time during the day). Other constructions include various other types of cycles, each of which vary based on the type of animal species present in the containment elements 22 and desired air flow rates into each of the containment elements 22.

Figure 4:
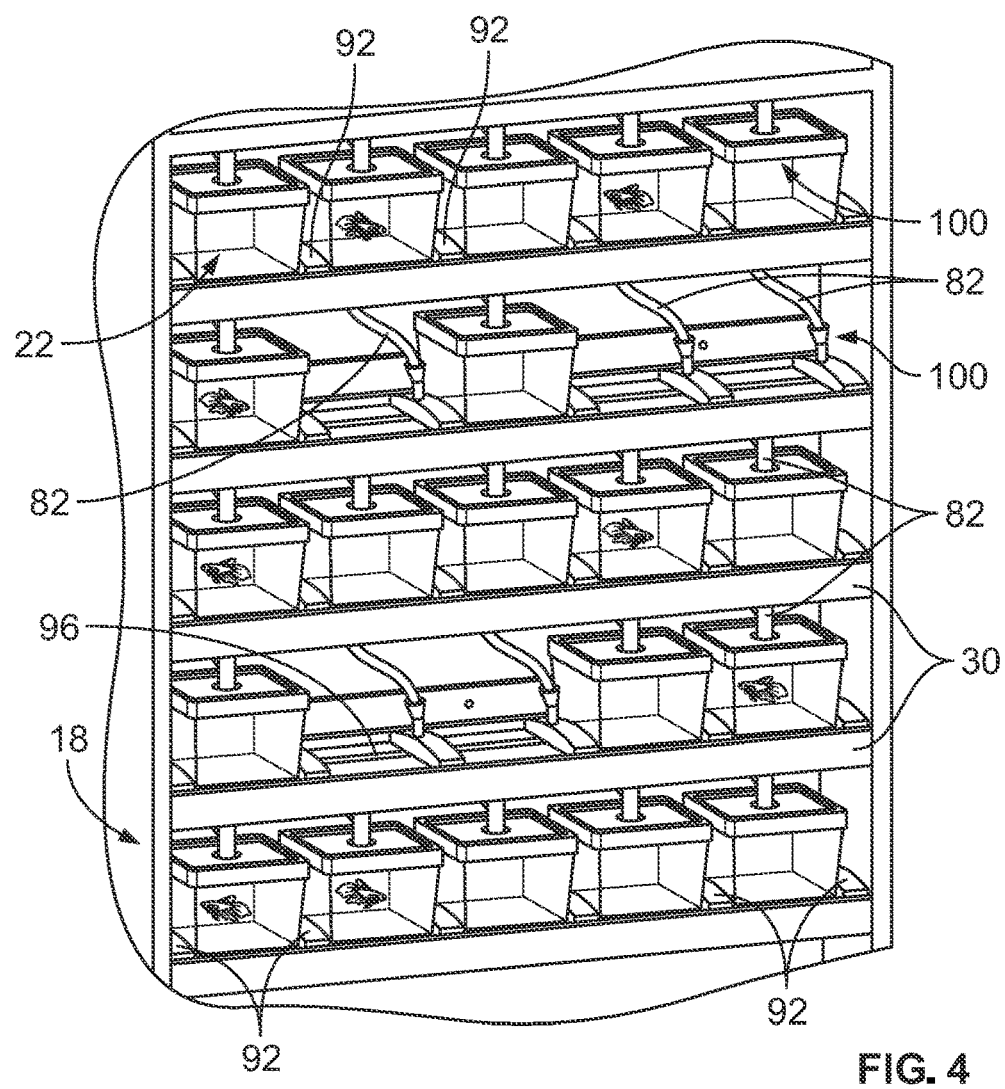
FIG. 4 is a perspective view of a portion of the containment system, illustrating a plurality of shelves each partially or completely filled with containment elements.
Figure 5:
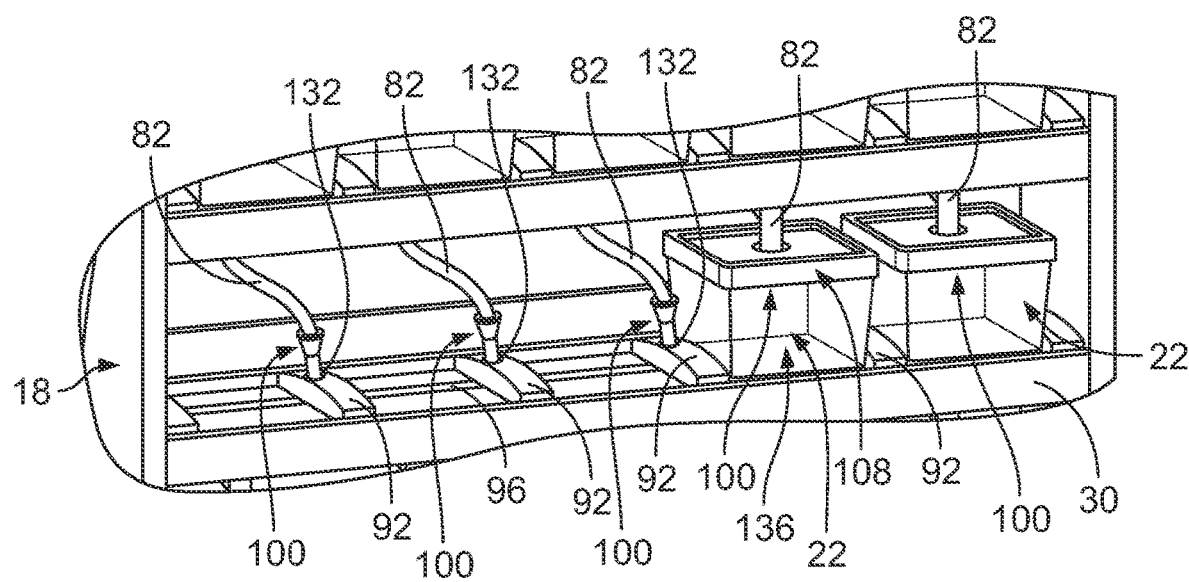
FIG. 5 is a perspective view of a single shelf of the containment system, partially filled with containment elements.
Figure 6:
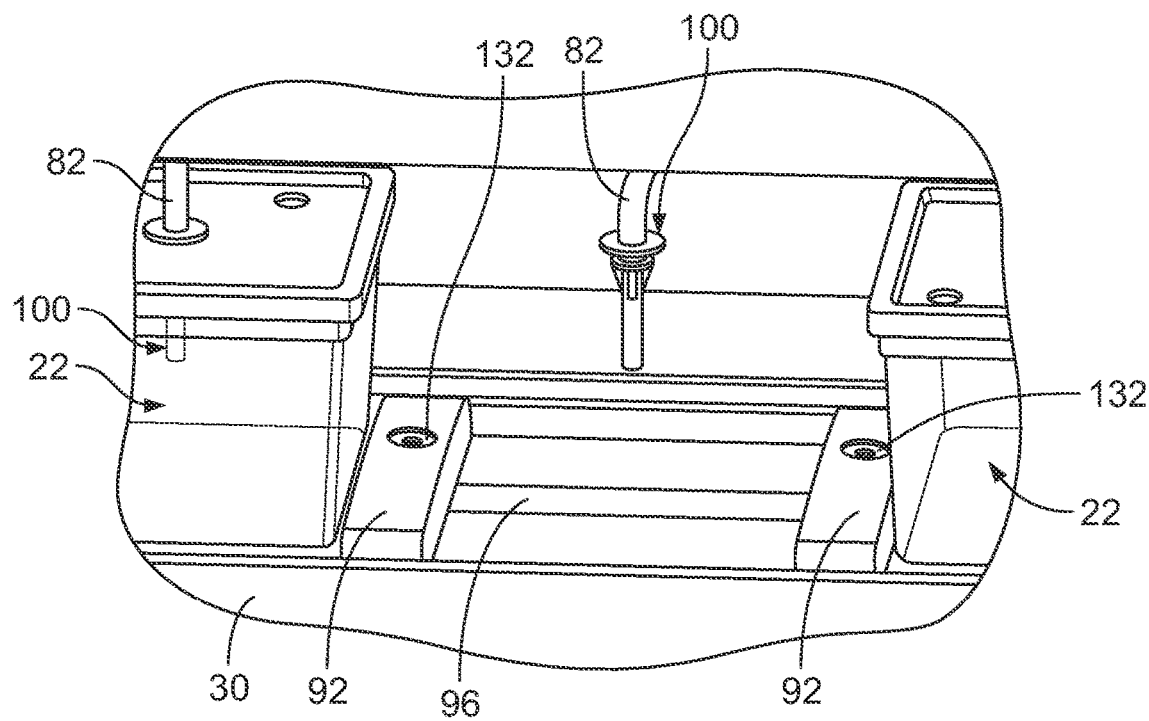
FIGS. 6 and 7 are enlarged perspective views of portions of a shelf of the containment system.
Figure 7:
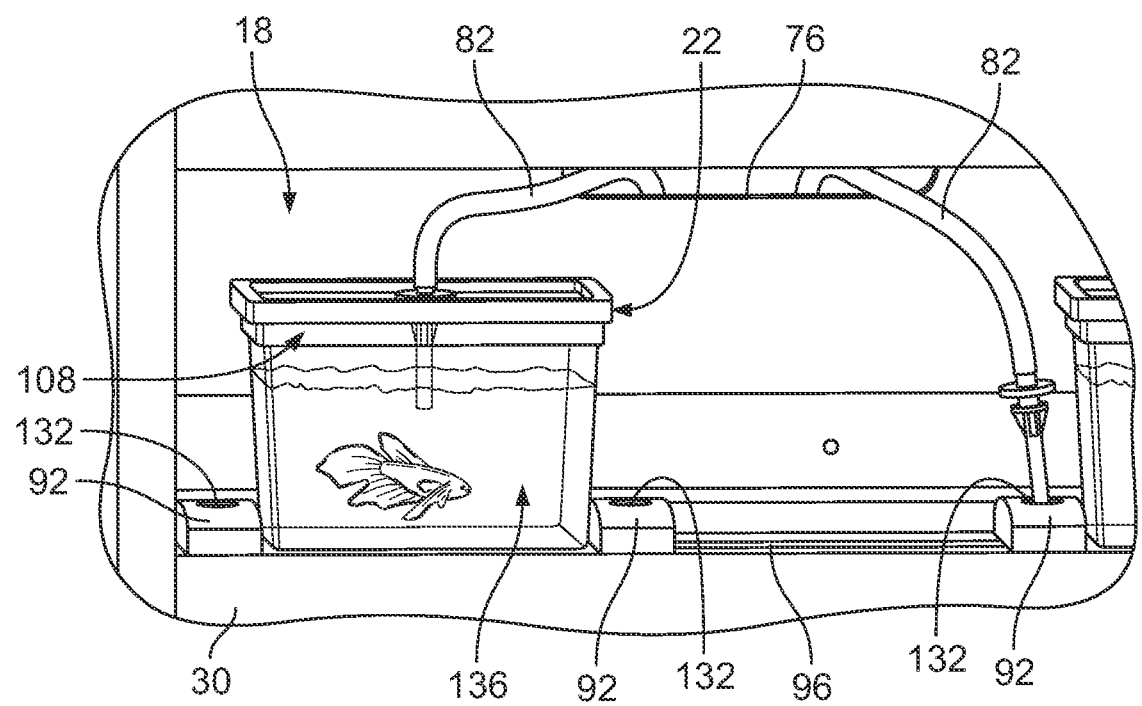

With reference to FIGS. 1 and 4, the base 18 includes elongate guide elements 92 that are disposed on the shelves 30, 38 and provide added support for the containment elements 22. In some constructions the guide elements 92 are integrally formed as part of the shelves 30, 38. The guide elements 92 position the containment elements 22 along the shelves 30, 38, such that the containment elements 22 are disposed below the outlet ends 82 of the air distribution system 48. The guide elements 92 provide pathways for removal and insertion of the containment elements 22 within the base 18, and inhibit the containment elements 22 from sliding laterally along the shelves 30, 38. The guide elements 92, in combination with the shelves 30, 38, provide for quick insertion, servicing, and removal of the containment elements 22, and further provide for a clean and finished overall appearance to the system 10. Other constructions include different shapes, sizes, and positions for the guide elements 92 than that illustrated.

With continued reference to FIG. 4, the system 10 also includes a plurality of elongate lighting elements 96 (e.g., LEDs) that are disposed above the shelves 30, 38 and extend between the guide elements 92. In some constructions the lighting elements 96 are formed as part of the shelves 30, 38. The lighting elements 96 emit light (e.g., blue or other light) into the containment elements 22 from beneath the containment elements 22, and are powered by the electrical equipment 56 disposed in the compartment 52. Other constructions include different shapes, sizes, and positions for the lighting elements 96 than that illustrated.

Figure 8:
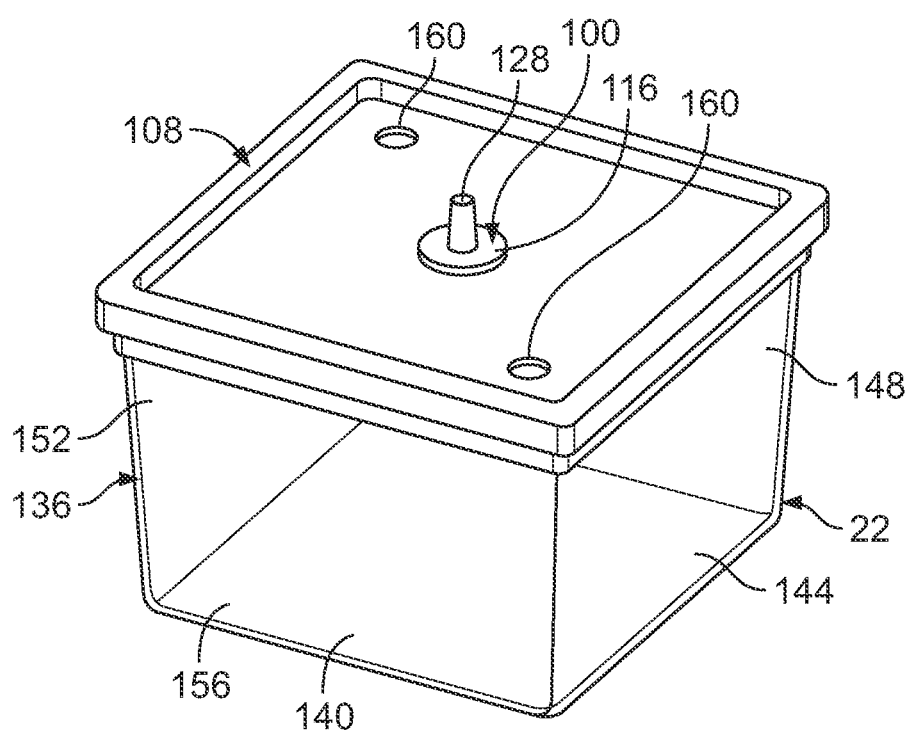
FIG. 8 is a perspective view of one of the containment elements.
Figure 9:
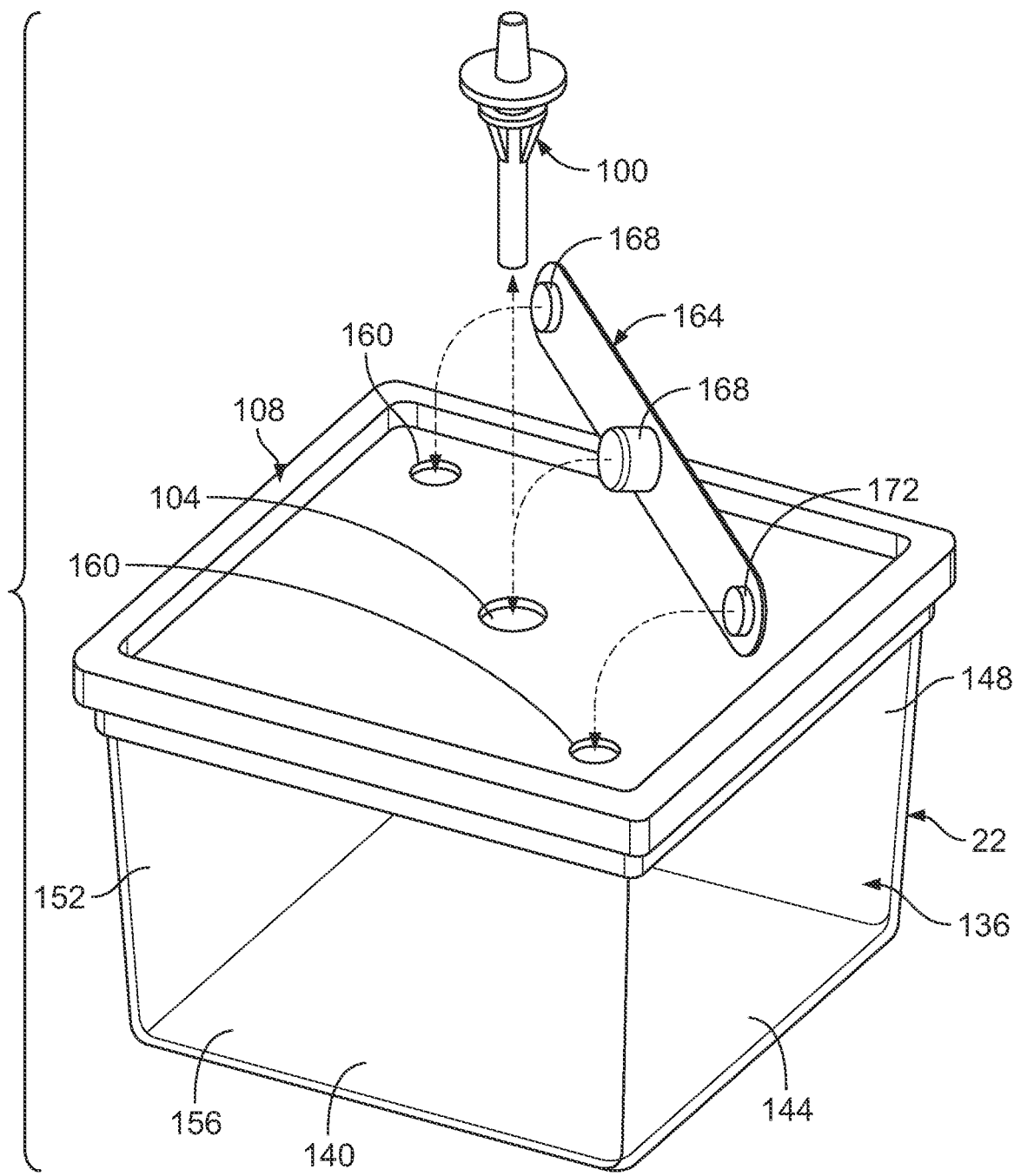
FIG. 9 is an exploded perspective view of one of the containment elements, along with a nozzle for distributing air into the containment element.
Figure 10:
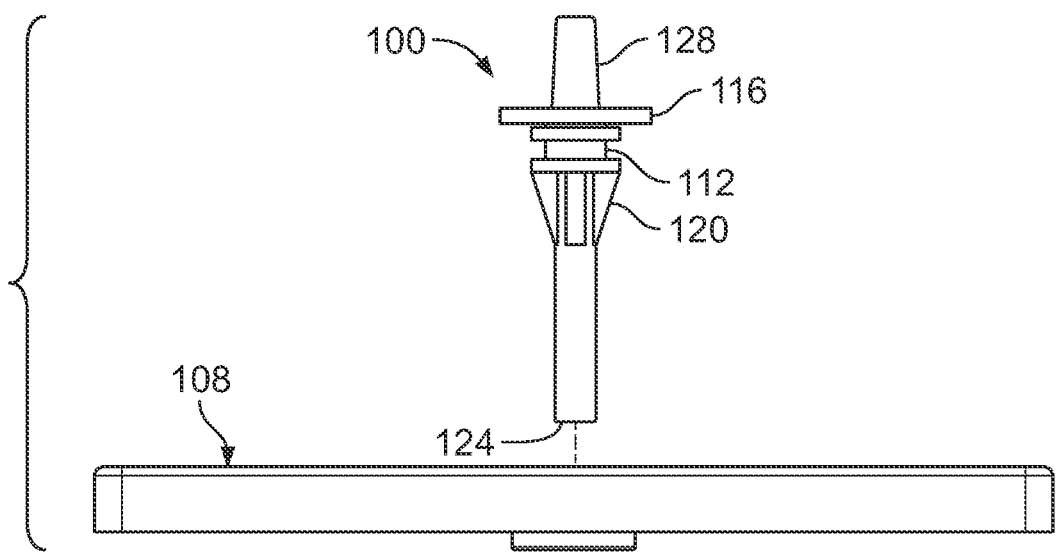
FIG. 10 is a front view of a cover of one of the animal containment elements, along with the nozzle.

With reference to FIGS. 4-13, the air distribution system 48 includes nozzles 100 coupled to the outlet ends 82. The nozzles 100 provide pathways for air to move from the outlet ends 82 into the water within each containment element 22. The nozzles 100 extend into the containment elements 22 through apertures 104 (illustrated in FIG. 9) disposed on covers 108 of the containment elements 22. As illustrated in FIG. 10, each nozzle 100 includes a nozzle positioning guide 112 that positions the nozzle 100 within the aperture 104, a cover interface stop 116 that remains outside of the containment element 22 and further helps position the nozzle 100, a cover interface lock channel 120 that receives an O-ring or other element so that when the nozzle 100 is inserted into the aperture 104 a positive connection is made, a termination end 124 that terminates in the water within the containment element 22, and a tube connection end 128 that couples to the outlet end 82.

The positioning of the nozzles 72 determines turbulence and circulation rates within the containment elements 22. In some constructions the nozzles 72 have venture-style fittings to induce water circulation within the containment elements 22 as air exits the nozzles 72. When the airflow rates are high and water levels are near tops of the containment elements 22, improper placement of the nozzles 72 can result in water overflow. The apertures 104, nozzle positioning guides 112, cover interface stops 116, and cover interface lock channels 120 help position the nozzles 100 properly and prevent water overflow, and enable specific, controllable, and reproducible placement of the nozzles 100 into the containment elements 22.

With reference to FIGS. 4-7, in some constructions the shelves 30, 38 are not completely filled with containment elements 22. Some of the nozzles 100 thus do not extend into the water within a containment element 22, but instead terminate into the atmosphere. The air distribution system 48 can only tolerate a limited number of nozzles 100 that terminate into the atmosphere. If too many nozzles 100 terminate into the atmosphere, the back pressure created by the nozzles 100 that are submersed in water in the containment elements 22 becomes too great relative to the lower resistance of the nozzles 100 that terminate into the atmosphere, and all of the air then flows out of the nozzles 100 that terminate into the atmosphere rather than out of the nozzles 100 that are disposed within the containment elements 22.

To prevent all of the air from flowing out of the nozzles 100 that terminate into the atmosphere, the guide elements 92 include air termination plugs 132 that receive the nozzles 100. The air termination plugs 132 hold the nozzles 100 in place, and prevent air from flowing out of the nozzles 100. The plugs 132 are disposed on the guide elements 92. In some constructions caps are provided instead that fit over the ends of nozzles 100. In some constructions one or more valves are used instead to open and close the nozzles 100 or to open and close the air distribution system 48. Other constructions include other structures that prevent the nozzles 100 from terminating into the atmosphere and allowing air to flow out into the atmosphere.

With reference to FIGS. 8, 9, 11, and 12 each of the containment elements 22 has a body 136 with a generally rectangular shape. The body 136 includes a first sidewall 140, a second side wall 144, a third wall 148, and a fourth side wall 152. Each containment element 22 also includes a bottom wall 156, the cover 108 being disposed opposite the bottom wall 156, and the first, second, third, and fourth walls 140, 144, 148, 152 extending between the bottom wall 156 and the cover 108. At least one of the side walls 140, 144, 148, 152 is flat, clear and transparent, providing a clear view of water and one or more aquatic animals inside the containment element 22, without refractive lighting and viewing that can occur with a more rounded containment element (e.g., such as the rounded containment element 222 illustrated in FIG. 12, where due to refraction of the round containment element 222, a fish can barely be seen, can be seen only in a distorted state, or in many locations within the containment element 222 cannot be seen at all). In contrast to containment element 222 in FIG. 12, the animal in containment element 22 is visible in all locations within the containment element 22 and is not distorted in any way. Additionally, in conjunction with the lighting elements 96, the animal's coloration is displayed within containment element 22.

In some constructions one or more of the sidewalls 140, 144, 148, 152 is frosted or fogged, to provide limited to no viewing inside of the containment element 22 through that particular sidewall. For example, in some constructions the side walls 144 and 152 are frosted, whereas the side walls 140 and 148 are clear and transparent, with the side wall 140 being oriented toward the front of the base 18 (i.e., visible to consumers), and the side walls 144 and 152 being oriented toward other containment elements 22 along one of the shelves 30. In this arrangement the animals inside of the containment elements 22 are prohibited from viewing one another through the frosted sidewalls 144 and 152, which helps to prevent undesired stress and anxiety for some species.

Figure 11:
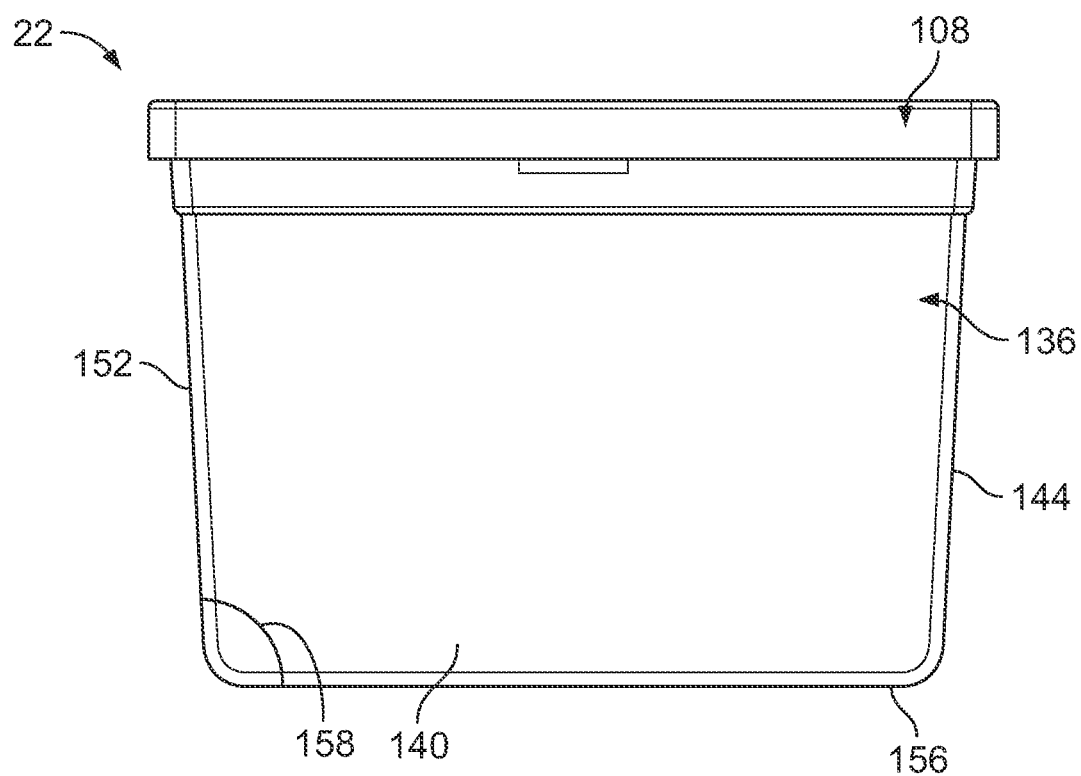
FIG. 11 is a side view of one of the containment elements.
Figure 12:
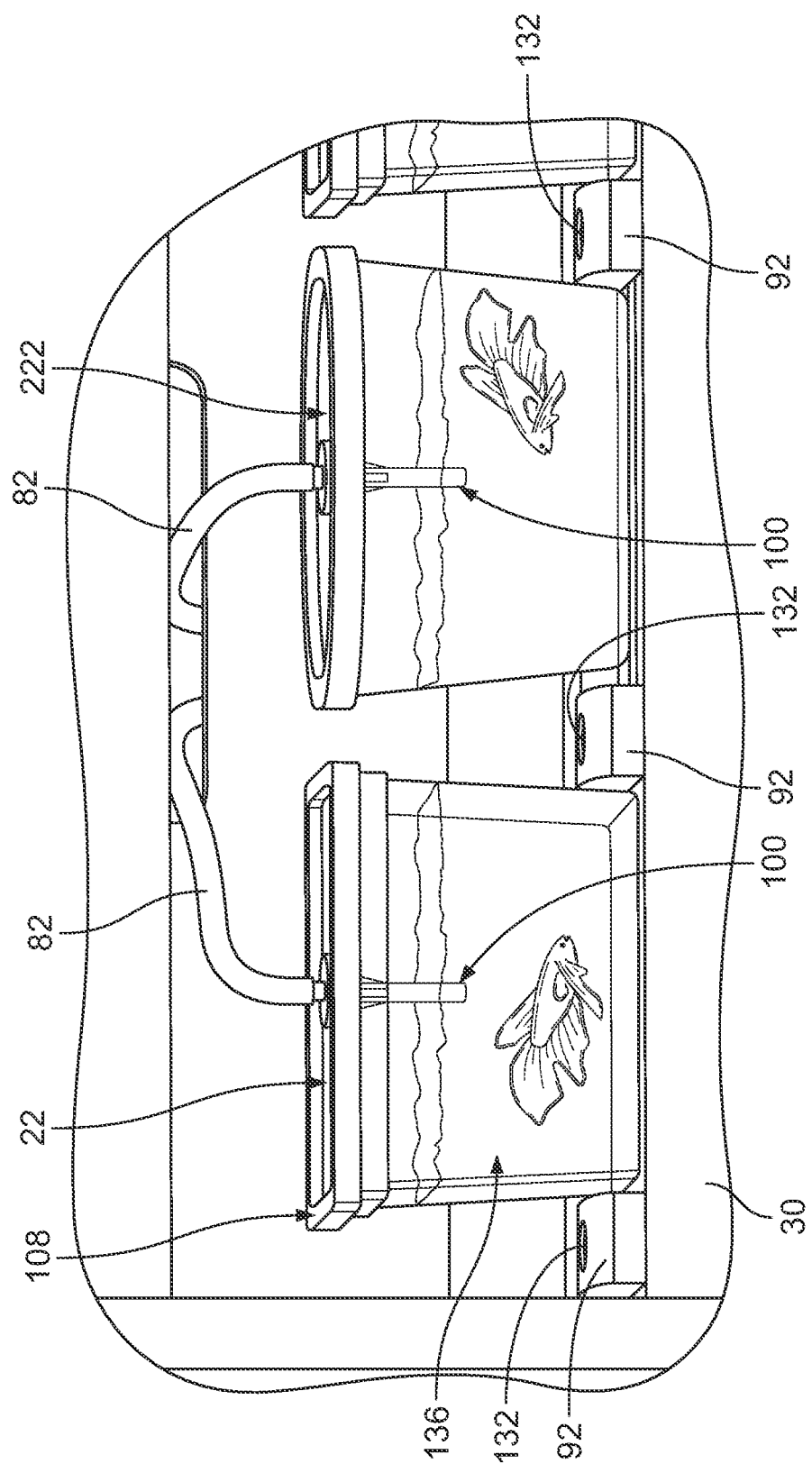
FIG. 12 is a perspective view of one of the containment elements next to a differently-shaped containment element.

With continued reference to FIGS. 8, 9, and 11, each sidewall 140, 144, 148, 152 extends at an angle 158 (illustrated for example in FIG. 11) relative to the bottom wall 156 between 95-105 degrees. In some constructions each sidewall 140, 144, 148, 152 is angled at approximately 100 degrees relative to the bottom wall 156. Other constructions include different ranges and values for the angles. The arrangement of the sidewalls 140, 144, 148, 152 in the illustrated containment elements 22 enables the containment elements 22 to be placed close together, while also allowing fingers to grab hold of the containment elements 22 for removal.

With reference to FIGS. 8 and 9, each containment element 22 also includes two access openings 160 disposed in the cover 108 that are used for adding food and water to the containment element 22 without having to remove the cover 108. While two access openings 160 are illustrated, other constructions include different numbers and locations of access openings 160. The containment element 22 also includes a closure member 164 that includes projections 168 which seal and cover the openings 160 and the aperture 104 when the containment element 22 is not in use, or when no air, food, or water is being added to the containment element 22.

Figure 13:
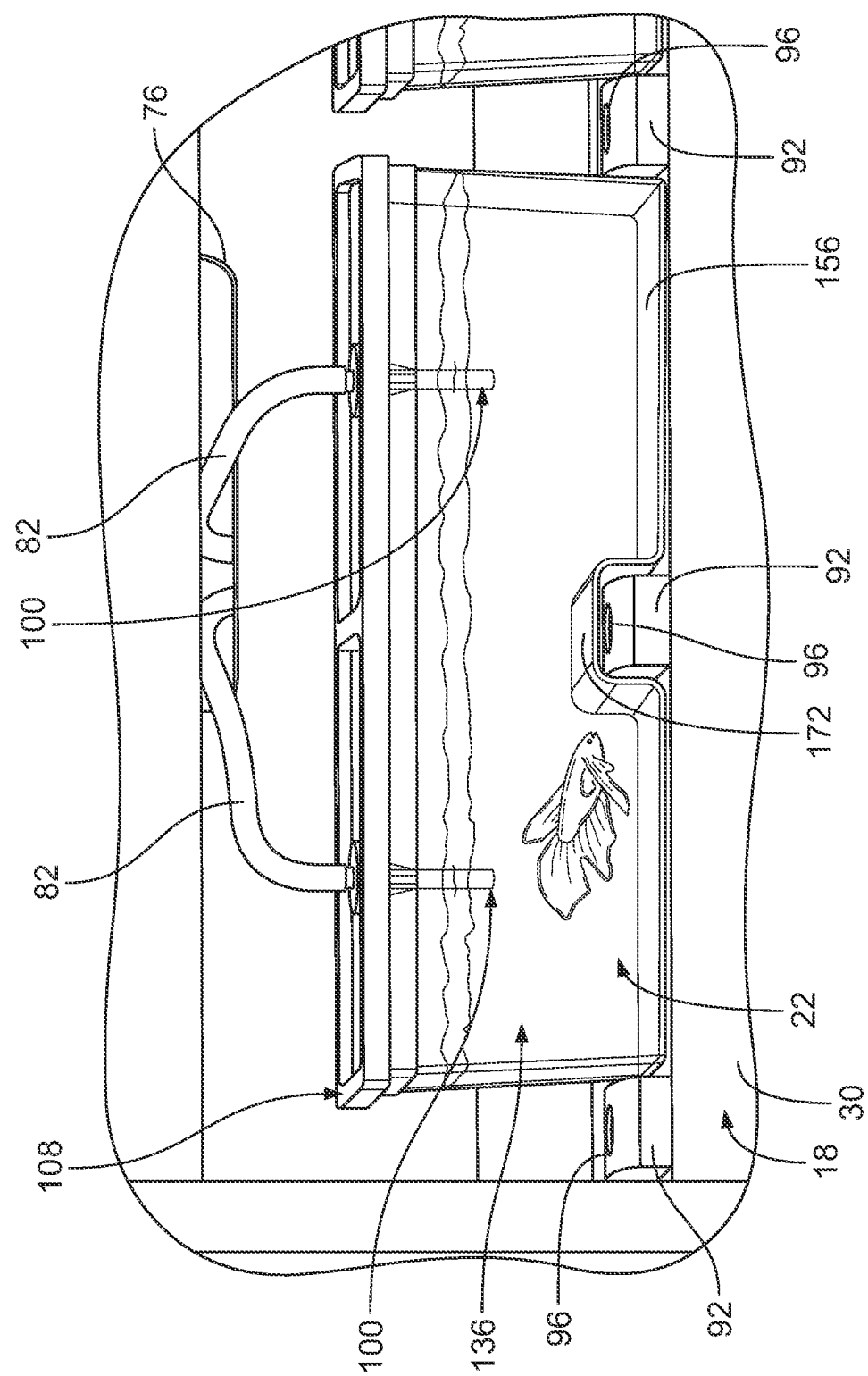
FIG. 13 is a perspective view of a containment element having a double-wide configuration.

With reference to FIG. 13, in some constructions one or more of the containment elements 22 has a "doublewide" configuration, wherein the containment element 22 includes a raised area 172 along the bottom wall 156 that is sized and shaped to slide over one of the guide elements 92. The doublewide containment element 22 is twice as wide as the containment elements 22 in FIGS. 1-12, and includes approximately twice the water. Other constructions include containment elements 22 that are three times as wide, etc. than the containment elements 22 in FIGS. 1-12, and include two or more raised areas 172 such that the containment elements 22 are still able to easily fit onto the shelves 30, 38. As illustrated in FIG. 13, the doublewide containment element 22 uses two nozzles 100, so that twice the quantity of air may be added.

Overall, the size and shape of the containment elements 22 illustrated in FIGS. 1-13 maximizes the density of removable containment elements 22 within the overall system 10 while also maximizing water volume and preserving optimal viewing. Further, with enhanced oxygenation and water circulation, the morbidity and mortality rates of the animals in the containment elements 22 is decreased and the overall health and wellbeing of the animals increases.

The system 10 maintains animal health through aeration, creating sustainable oxygenation levels, as well as water circulation within the containment element (e.g., removing and adding water to the containment element 22). The system 10 is designed for short to medium term residency and storage of the animals within the containment elements 22. In particular, the system 10 is designed to store each animal for a few weeks to a few months at a time (as opposed to years) before turnover occurs. Although, other constructions may be designed to provide different storage times. Because the functionality of the system 10 is designed for short to medium term residency and storage, the system 10 is able to operate without the use of a common water supply/exchange system and the complications associated with a common water supply/exchange system. Despite the short to moderate term residency of the animals within the system 10, specific needs of each species of animal (e.g., oxygenation requirements, water circulation flow rates and special volumetric requirements for movement) are still met with the air distribution system 48 and containment elements 22 described above.

In use, the system 10 is positioned within a store at a location where animals such as fish are typically sold. Containment element 22 are positioned on the various shelves 30, 38 and are filled with water. A salable quantity of the aquatic animals (e.g., one Betta fish) is positioned in each containment element 22 so that the animals are prominently displayed. The tubes 80 are connected to each of the containment elements 22 and the pump 64 is operated to deliver air to each of the containment elements 22. The lighting elements 96 illuminate the containment elements 22 and in combination with the noise produced by the air distribution system 48 attract customers to the system 10. When a customer selects an animal for purchase, there is no need to capture the animal or scoop it from the containment element 22. Rather, the tube 80 is disconnected from the containment element 22 and the containment element 22 is removed from the base 18 and sold with the animal. The containment element 22 is used to transport the animal to the customer's home before placement into the customer's habitat. The lighting cycles (and colors) and aeration cycles can be timed to coincide with the circadian cycle or with shopping cycles as may be desired. While the animals are on display, water and food can be added to the individual containment elements 22 as necessary to sustain the animals and to balance the air distribution system 48.

Another construction of a containment system 510 is illustrated in FIGS. 14-18. Like the system of FIG. 1, the system 510 of FIGS. 14-18 provides a series of horizontal shelves 515 spaced apart from one another to facilitate the placement and display of objects 520 or products (typically animals) for sale in a retail setting. As illustrated in the first system 10, the objects 520 being displayed typically include containers 22 that contain the animals being sold. The system 510 is a modular system that is assembled from a number of bars 525, connectors 530, shelves 515, and panels 535 all preferably formed from plastic materials. In the illustrated construction, the bars are hollow bars 525 having a rectangular cross-section. Of course, other cross-sectional shapes could be employed if desired. Various length bars 525 are provided to allow for the assembly of multiple displays 510 and to provide different spacing as desired.

Figure 23:
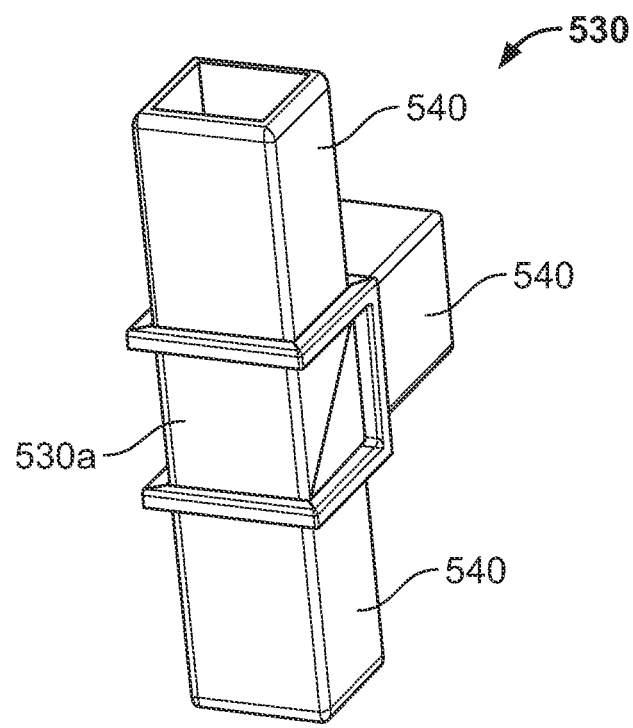
FIG. 23 is a perspective view of a connector.
Figure 24:
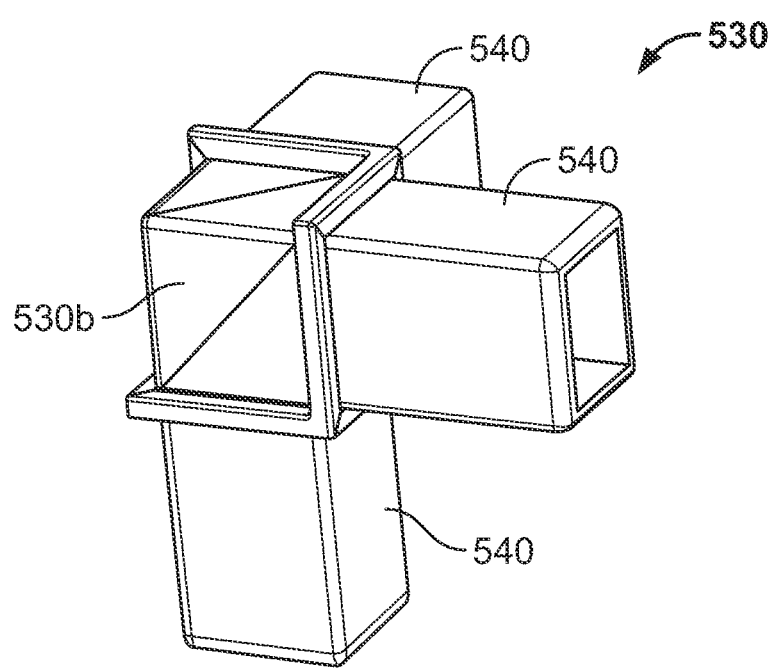
FIG. 24 is a perspective view of a corner connector.

FIGS. 23 and 24 illustrate two different shaped connectors 530 with still other shapes being possible. FIG. 23 illustrates an example of a typical connector 530a. The illustrated connector 530a is generally T-shaped to allow for the connection of three bars 525 in a common plane using a single connector 530a. The connector 530a includes three male portions 540 that each fit into one of the bars 525 to make the desired connection. Some connectors 530 can be two-way or four-way as may be required by the desired arrangement of the system 510 with FIG. 24 illustrating a corner connector 530b. The male portions 540 are arranged to match the cross-sectional shape of the bars 525. In the illustrated construction, they are generally rectangular to assure a snug fit and to maintain the desired orientation of the bars 525. As noted, different shaped connectors 530, such as corner connectors 530b are also provided to allow for the assembly of the desired shaped system 510.

Various panels 535 can be provided to cover empty spaces within the display 510 to provide a visually pleasing structure. In addition, panels 535 can include printing, advertising, or other markings to further attract attention to the products being displayed.

Figure 14:
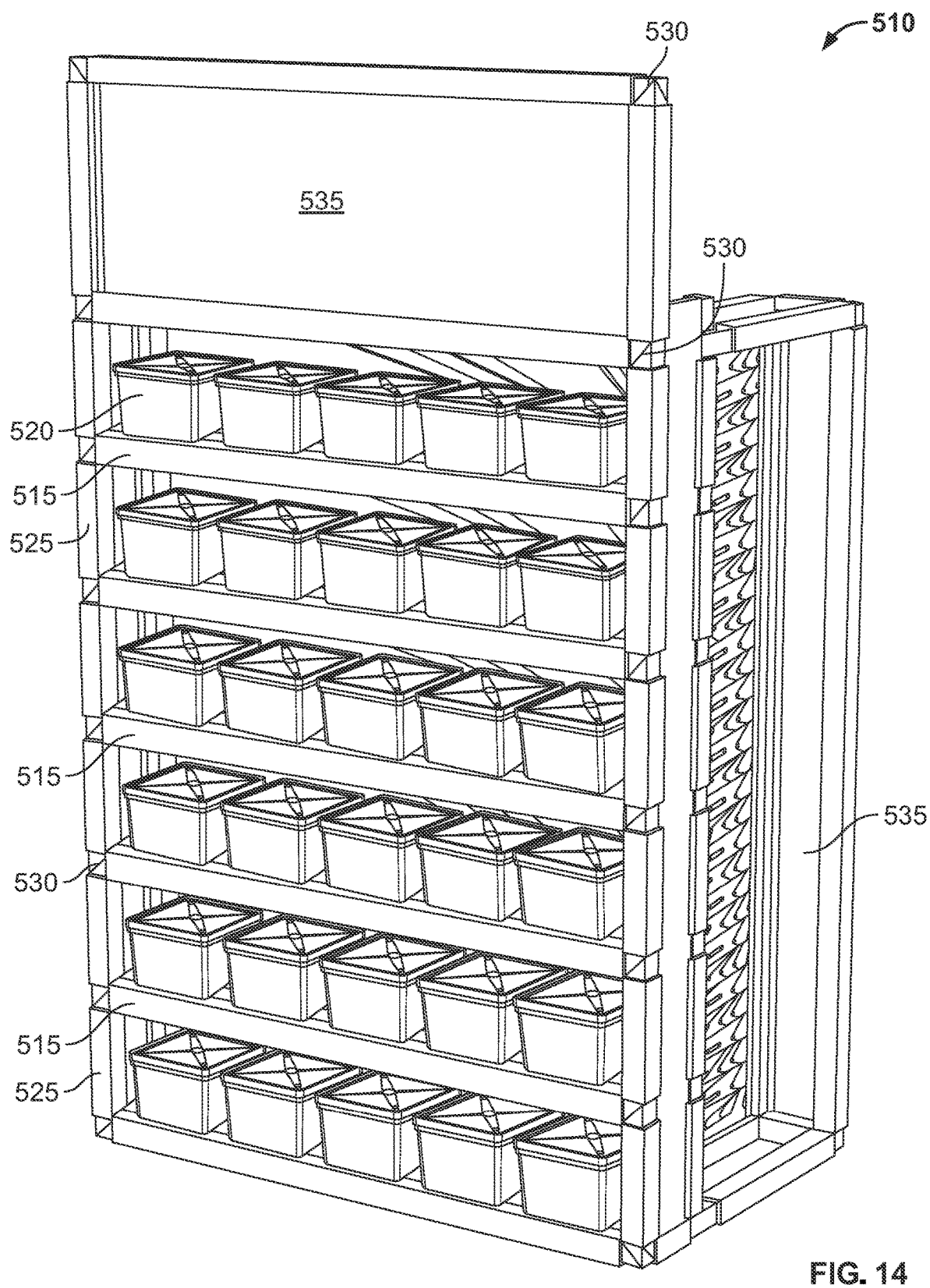
FIG. 14 is a perspective view of another containment system.
Figure 15:
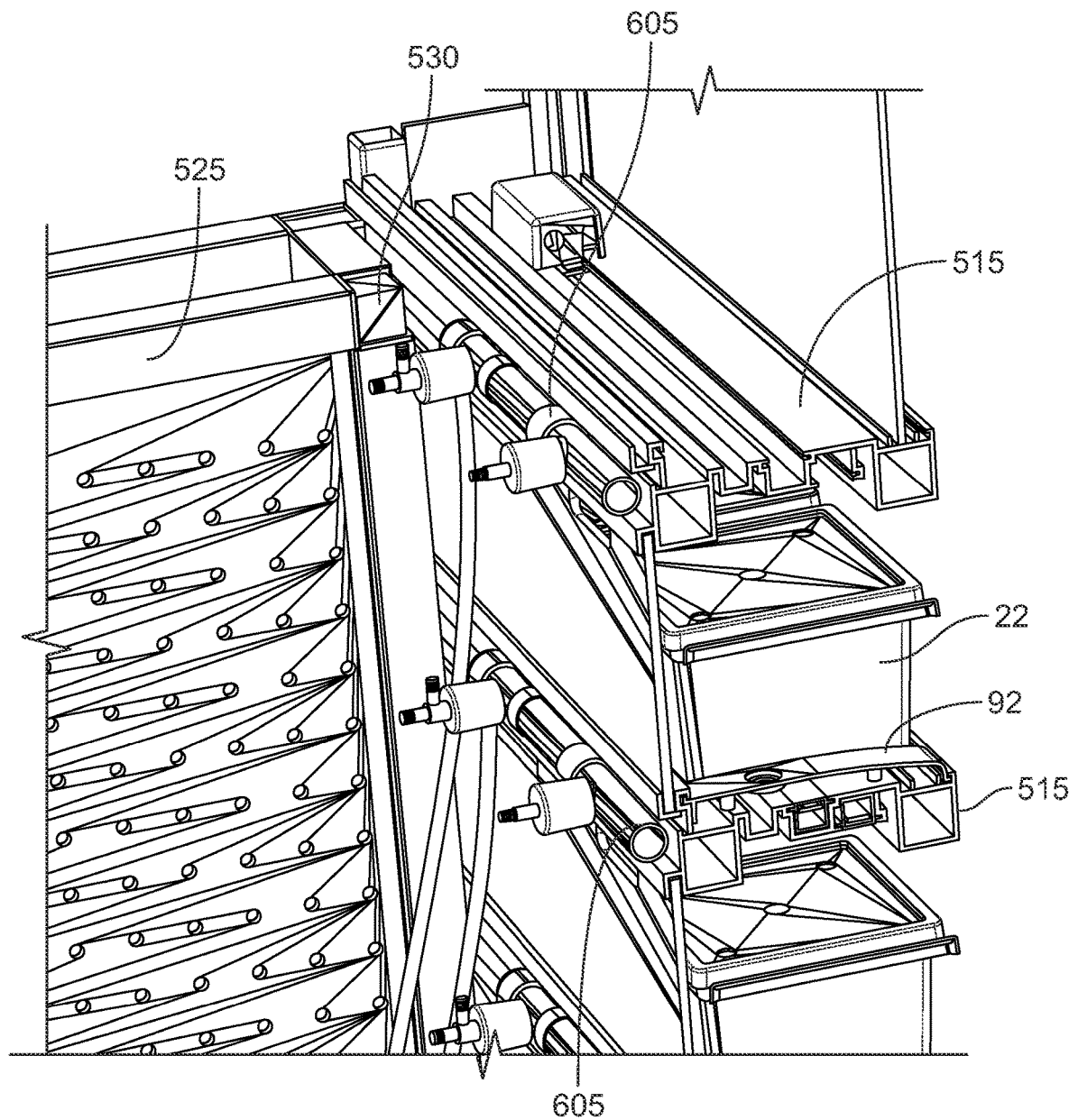
FIG. 15 is an enlarged perspective view of a portion of the containment system of FIG. 14.
Figure 16:
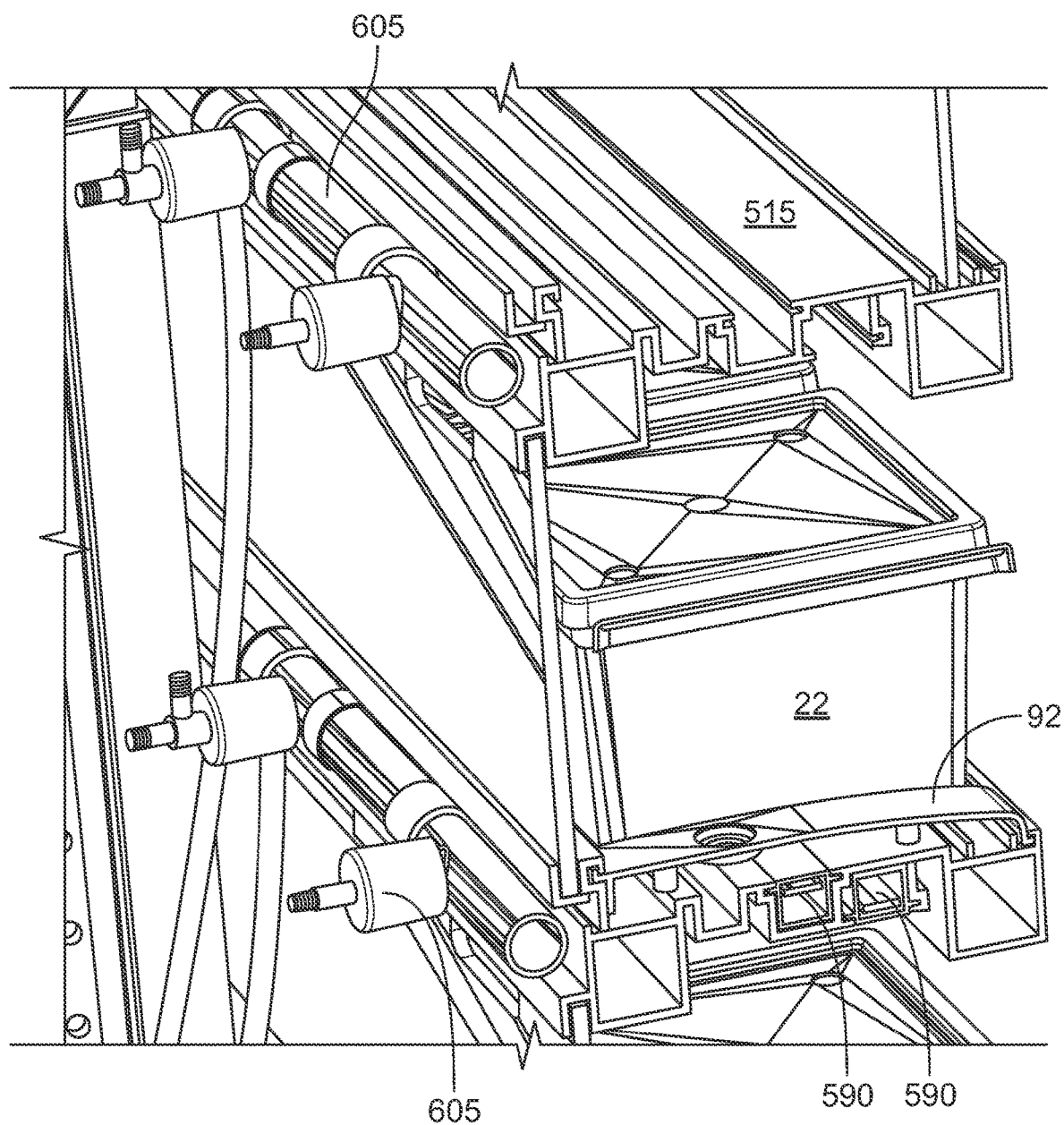
FIG. 16 is an enlarged perspective view of a portion of the containment system of FIG. 14.
Figure 22:
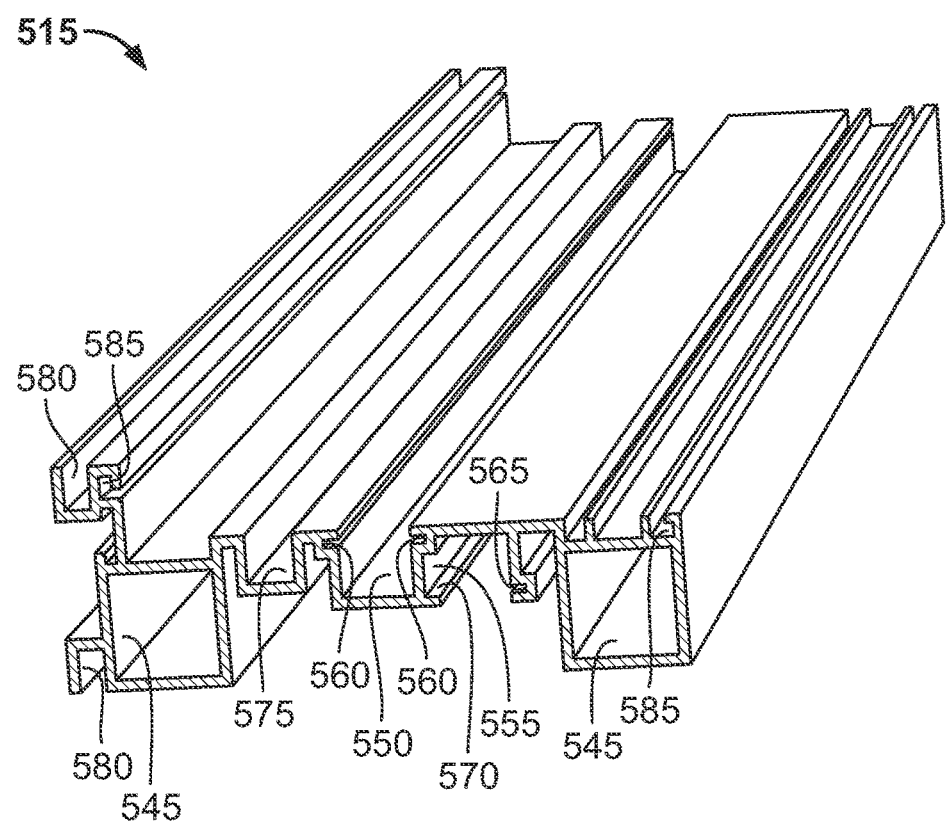
FIG. 22 is a perspective view of a shelf extrusion.

FIG. 22 illustrates a shelf or shelf extrusion 515 for use in the system of FIG. 14. The shelf 515 is preferably an extruded plastic component but other materials and processes could be employed. The shelf 515 defines a cross-sectional shape that extends the full length of the shelf 515 and includes two large rectangular or square passages 545. These passages 545 are arranged to receive the connectors 530 and to provide stiffness to the shelves 515. The shelf extrusion 515 also defines two medium channels 550, 555 that are enclosed on three sides. A first of the medium channels 550 includes an open side that faces upward from the shelf 515 toward any objects 520 that might sit on the shelf 515. A pair of opposed slots 560 are formed in the sidewalls of the first medium channel 550. A second of the medium channels 555 is enclosed on three sides and includes an open side that faces downward from the shelf 515 toward any objects 520 that might sit on a shelf 515 below. The second medium channel 555 includes a slot 565 formed on one of the sidewalls and a leg 570 extending from the opposite side wall, with the slot 565 and the leg 570 extending the length of the second medium channel 555.

A small channel 575 extends the length of the shelf 515 and is enclosed on three sides. The open side faces upward from the shelf 515 toward any objects 520 placed on the shelf 515. Two U-shaped channels 580 are formed on the rear of the shelf extrusion 515 with one having an opening facing upward and the other facing downward. The U-shaped channels 580 are arranged to oppose one another between adjacent shelves 515 to receive a back panel that completes the back of the system 510.

The shelf extrusion 515 also defines two hook-shaped channels 585 that extend the length of the shelf 515. The hook-shaped channels 585 are arranged to receive guide elements 92 (shown in FIGS. 15-17) that break up the length of the shelf 515 and separate individual objects 520 displayed on the shelf 515.

Figure 17:
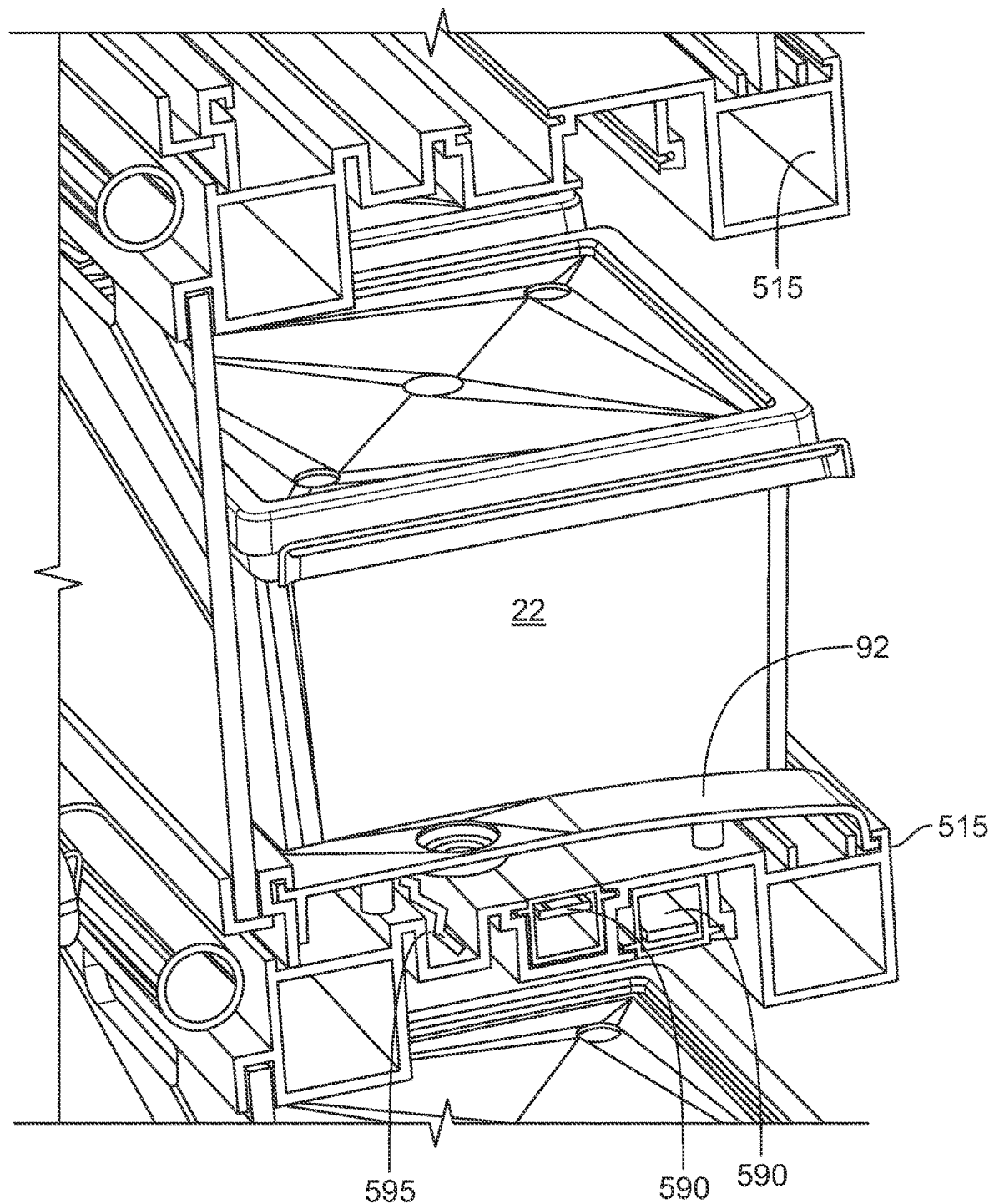
FIG. 17 is an enlarged perspective view of a portion of the containment system of FIG. 14.
Figure 18:
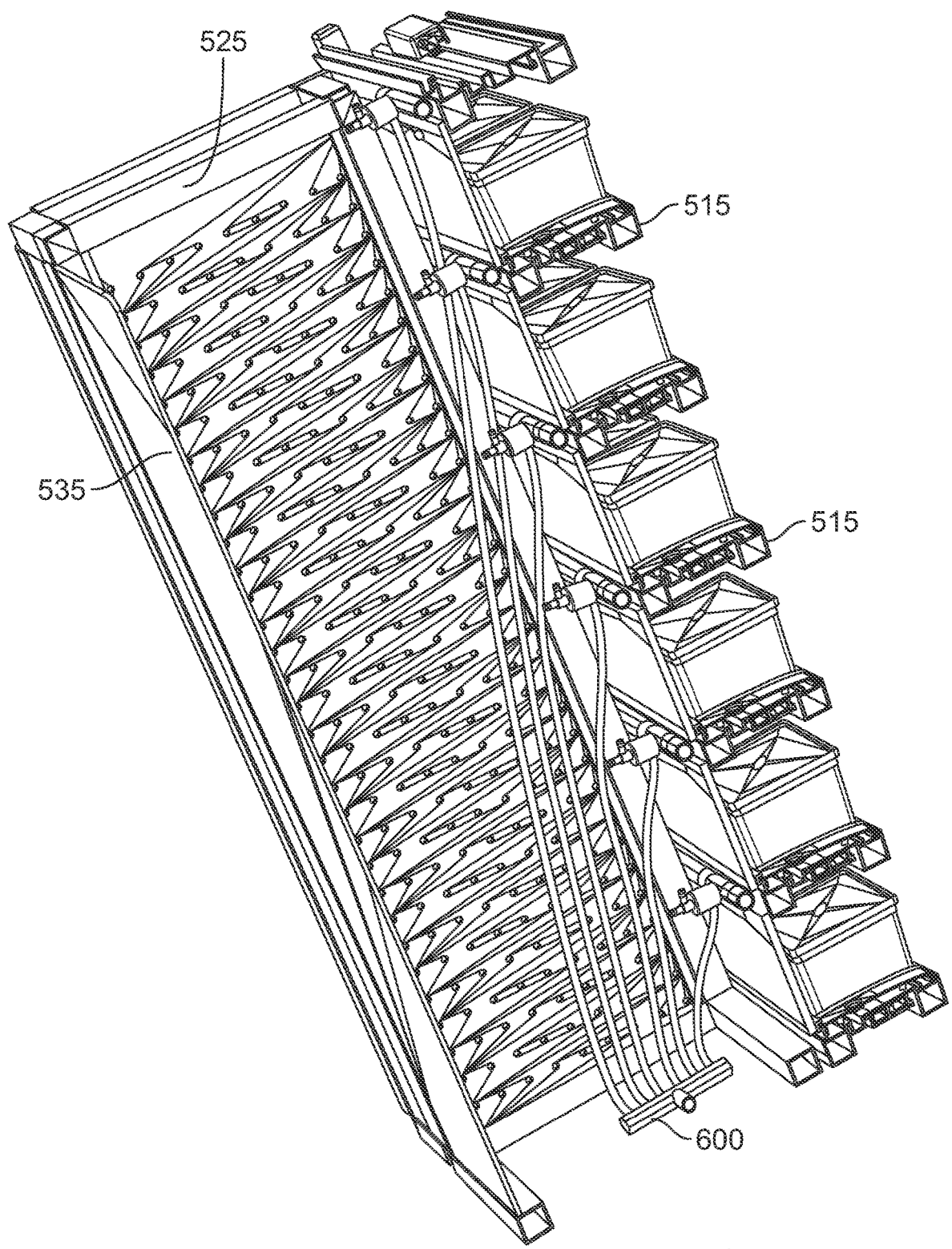
FIG. 18 is a perspective view of a portion of the containment system of FIG. 14

The first medium channel 550 and the second medium channel 555 are arranged to receive lighting elements 590 for illuminating objects 520 on the shelf 515 or below the shelf 515. As is best illustrated in FIG. 17, the first medium channel 550 receives a lighting element 590 that directs light upward to illuminate the object 520 being displayed from beneath. The lighting element 590, or a cover that is opaque (e.g., lens, shield, filter, etc.) engages the opposed slots 560 to maintain the position of the lighting element 590 within the first medium channel 550. In preferred constructions, the lighting element 590 is an LED lighting element selected to best illuminate the objects 520 being sold. In some constructions, the lighting element 590 is broken into segments, zones, or regions to allow individual control of the segments to illuminate the objects 520 in different ways. For example, some segments could be "on" while others are "off". Alternatively, different color lighting elements 590 could be provided along the entire lighting element 590 or in the different segments to allow different colored illumination along the length or in the individual segments. This can be particularly useful when displaying objects 520 such as tropical fish. Some fish look better under a blue light while others are better in red. Still other fish are fluorescent and glow when exposed to the appropriate color of light. Choosing the proper lighting colors for these fish can greatly enhance their appearance in a display setting.

The small channel 575 is arranged to receive a heating element 595 that extends along the length of the small channel 575. The heating element 595 can be arranged to provide heat to each and every object 520 on the shelf 515 or can include segments or zones that can be individually controlled to assure that each object 520 is heated to the desired temperature. In one construction, each object 520 includes a temperature sensor such as a thermocouple that measures the temperature of the object 520 and controls the heating element associated with that object 520. In this system, objects 520 that are best kept at different temperatures can be displayed next to one another. A controller that controls and allows for the selection of the temperature in each zone could be provided or simple individual controllers could be provided in each zone.

As with the system 10, the system 510 provides a supply of air that can be directed to each of the objects 520 being displayed. An air compressor 64 similar to the air compressor 64 shown in FIG. 2 provides a supply of air to a manifold 600 shown in FIG. 18, which in turn distributes the air to each shelf 515 positioned above objects 520 being displayed. The air is first directed to a shelf level pressure regulator 605 that reduces the air pressure to a level suitable for delivery to the objects 520 being displayed. As with the system 10 of FIGS. 1-14, the pressure regulator 605 also distributes the air to a plurality of tubes that are inserted into the objects 520 being displayed to provide the necessary air for the animals displayed.

The system 510 is well suited to displaying objects such as living animals. One type of animal that could be displayed is tropical fish such as Betta fish and other popular fish. However, the system 510 can also display other animals such as turtles, lizards, amphibians, and the like. Obviously, these animals do not require air to be delivered but they often are very sensitive to temperature and light conditions.

Figure 19:
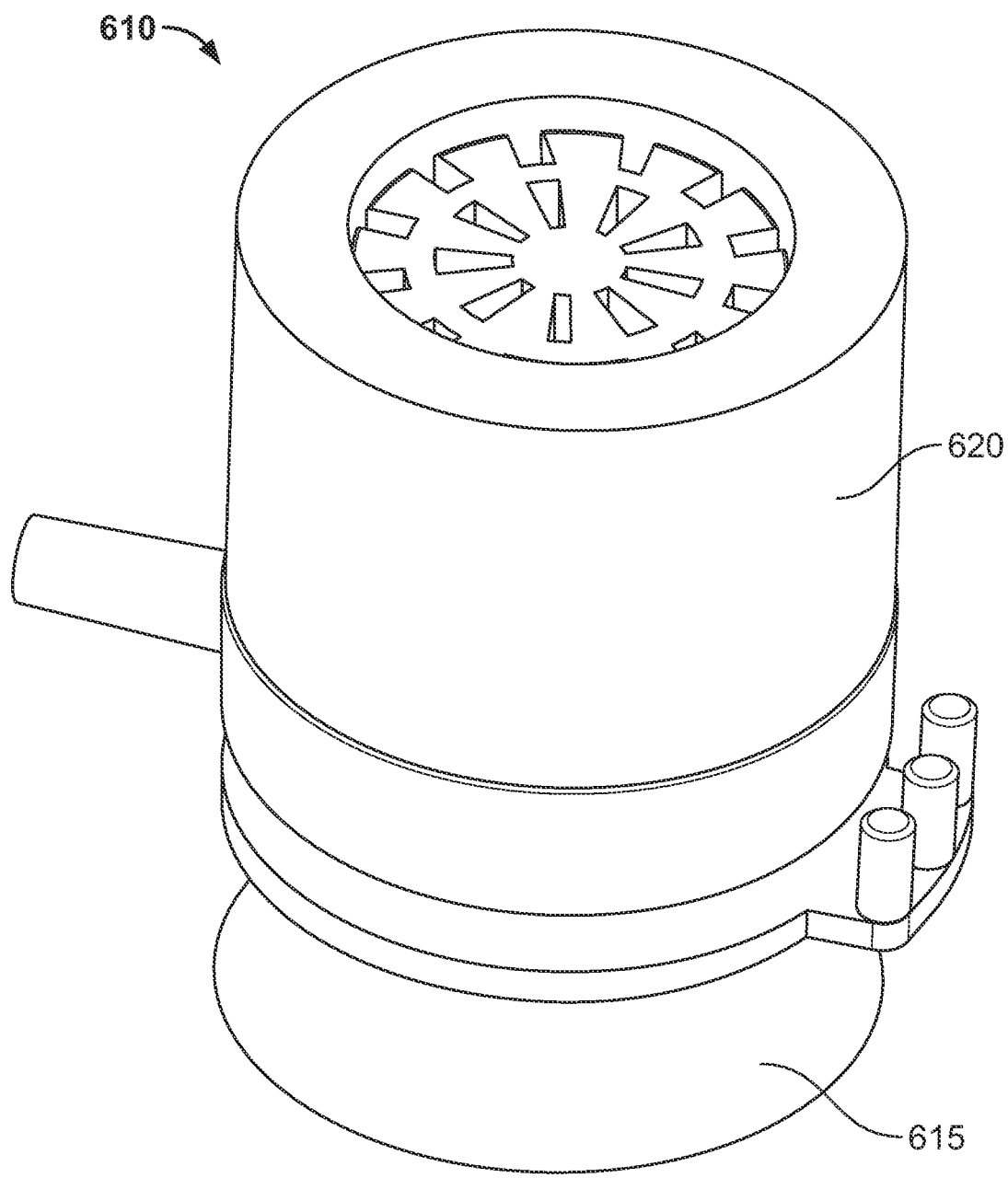
FIG. 19 is a perspective view of a micro-filter element.
Figure 20:
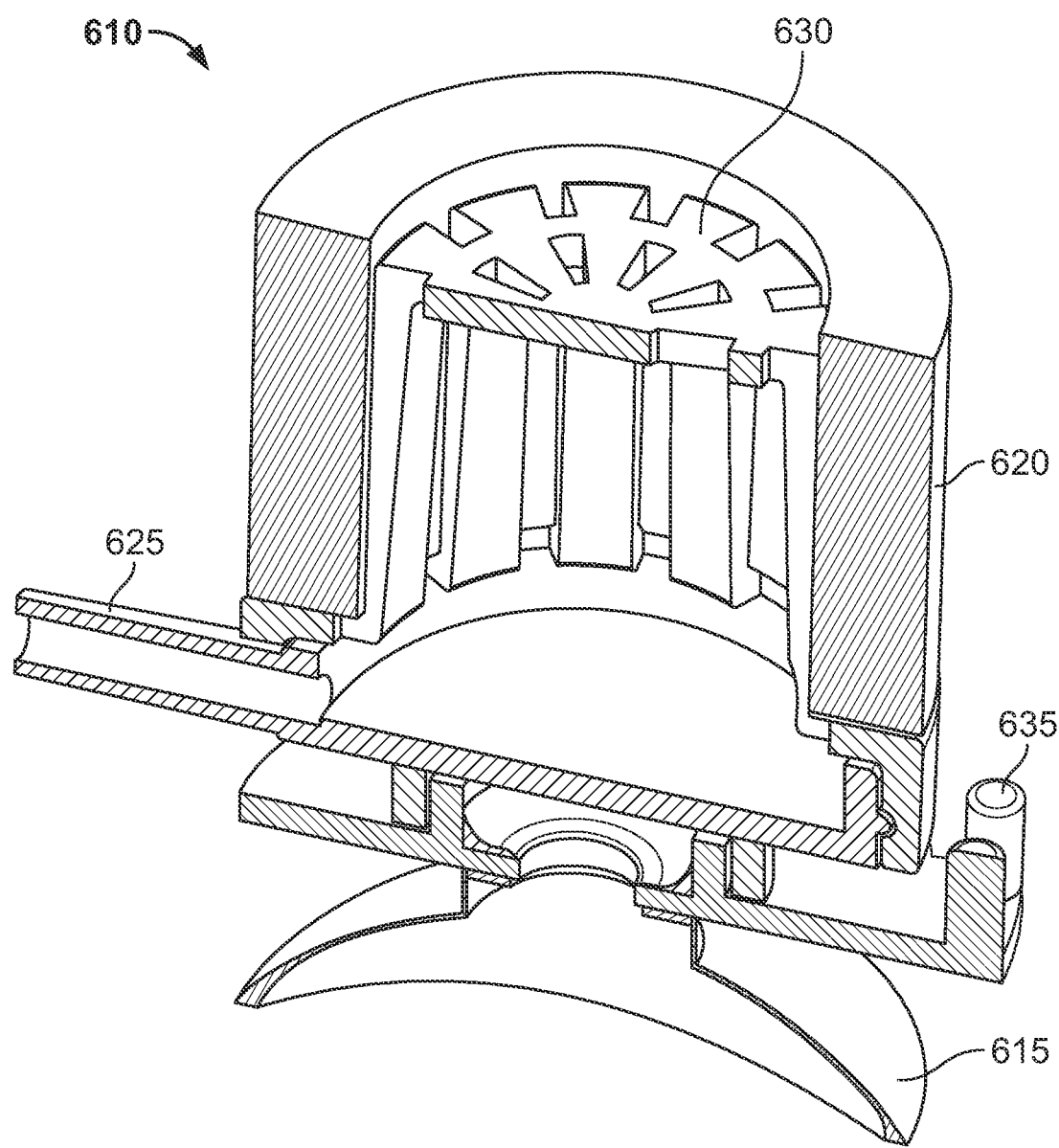
FIG. 20 is a section view of the micro-filter element of FIG. 19.
Figure 21:
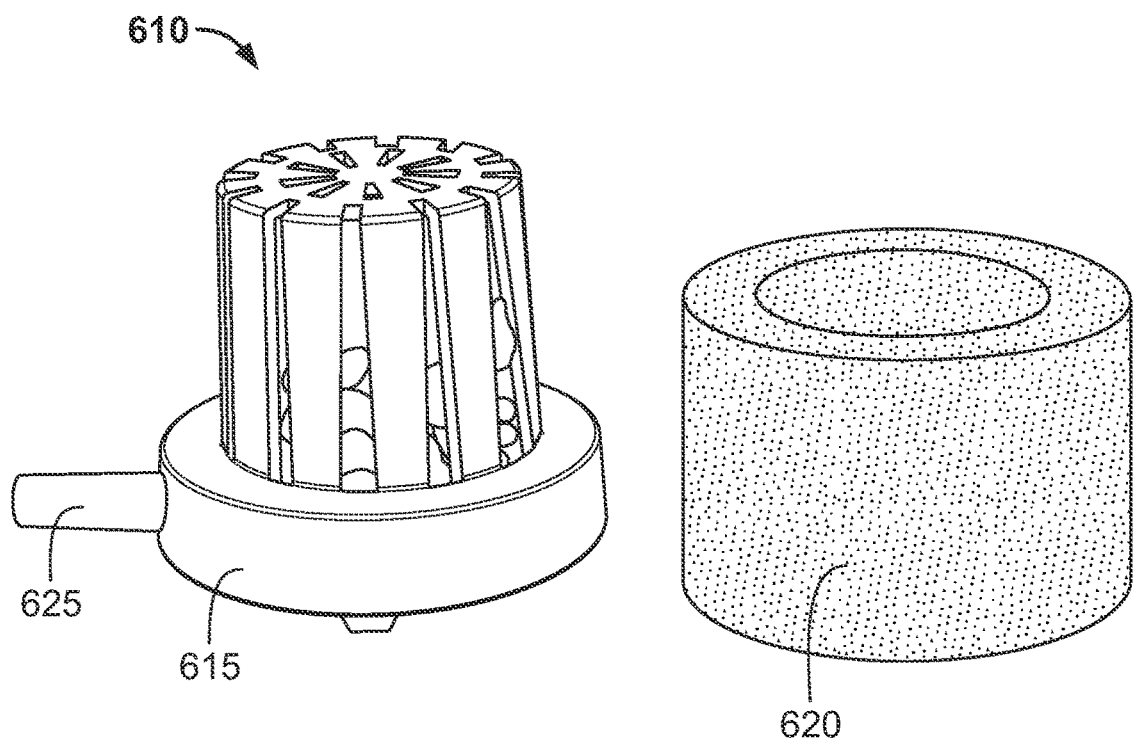
FIG. 21 is an exploded view of the micro-filter element of FIG. 19.

To further enhance the water quality, a micro-filter 610 can be positioned within selected objects 520 being displayed. FIGS. 19-21 illustrate one possible micro-filter 610 that is also described in U.S. Pat. No. 9,839,205 (Air-powered Filter for Aquarium), herein incorporated by reference. The filter 610 includes a body 615 and a filter membrane 620 positioned on the body 615. The body 615 is preferable formed from a plastic material and includes an inlet tube 625 and a cage portion 630 that is arranged to support the filter membrane 620 and allow for the passage of water and air therethrough. The body 615 also includes a support member 635 that extends from the body 615 and provides an attachment point for a decorative element such as an artificial or real plant that can be placed in the water.

In use, the user first assembles the display 510 to provide the number of shelves 515 desired. Panels 535 are positioned as required to provide the desired look and display space. Containment elements or containers 22 (objects) are selected for the animals to be displayed. Single containers 22 are selected for Betta fish or other animals that are sold as single units, while a doublewide container 22 might be used for larger animals or fish that are sold in larger quantities.

Once the animals to be displayed are selected, the temperature and light settings can be selected to optimize the display 510. As discussed, some animals may prefer warmer water than others, while non-water born animals may enjoy hotter environments than the normal store temperature. Air supplies can be connected to the containers 22 containing fish with micro-filters 610 installed in containers 22 containing fish that are more sensitive to their environments. In addition, bacterial colonies can be embedded in the filter membrane 620 of certain micro-filters 610 to further enhance the environment for certain species of fish.

Thus, the system 510 is capable of enhancing the environment for virtually any small animal displayed. The system 510 can provide the proper lighting, the proper temperature, and filtered water if required. In addition, proper bacteria can be introduced with the micro-filter 610 to provide the best environment possible for the particular animal being displayed. In some constructions, an air filter such as a carbon filter could be used to provide cleaner air to the containers 22 to still further enhance the environment.

It should be understood that aspects of the system 10, 510 described with regard to one embodiment are equally applicable to other embodiments. Components used or described with regard to one system, embodiment, construction, or application are equally applicable to any other system, embodiment, construction, or application described herein.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A modular shelving system comprising:
a plurality of shelves, each shelf having a length and defining a first passage, a second passage, a first channel, and a second channel, wherein each of the plurality of shelves defines a top surface arranged to support an object and a bottom surface opposite the top surface, and wherein the first channel defines an open side that faces the top surface and the second channel defines an open surface that faces the bottom surface;
a plurality of bars, each bar defining a length and including a first end and a second end opposite the first end;
a plurality of connectors, shaped to be received in one of the first passage, the second passage, a first bar opening, or a second bar opening to interconnect each of the plurality of shelves and each of the plurality of bars;
a plurality of containers, the containers coupled to an air supply, wherein each of the plurality of containers being removeably disposed on one of the plurality of shelves; and
a lighting element positioned within the first channel of a first of the plurality of shelves and arranged to at least partially illuminate an object positioned on the top surface of the first of the plurality of shelves.

2. The modular shelving system of claim 1, further comprising a cover coupled to the first of the plurality of shelves and arranged to cover the open side of the first channel.

3. The modular shelving system of claim 1, further comprising a second lighting element positioned within the second channel of the first of the plurality of shelves and arranged to at least partially illuminate an object positioned on the top surface of a second of the plurality of shelves disposed below the first of the plurality of shelves.

4. The modular shelving system of claim 3, further comprising a second cover coupled to the first of the plurality of shelves and arranged to cover the open side of the second channel.

5. The modular shelving system of claim 1, wherein each shelf further comprises a third channel that extends the full length of the shelf and defines an open side that faces upward when the shelf is assembled.

6. The modular shelving system of claim 1, further comprising a heating element.

7. The modular shelving system of claim 1, wherein each shelf is formed from a polymer material and is extruded to have a common uniform cross section for the entire length.

8. A modular shelving system comprising:
a plurality of shelves, each shelf having a length and defining a first passage, a second passage, a first channel, and a second channel, wherein each of the plurality of shelves defines a top surface arranged to support an object and a bottom surface opposite the top surface;
a plurality of bars, each bar defining a length and including a first end and a second end opposite the first end;
a plurality of connectors, shaped to be received in one of the first passage, the second passage, a first bar opening, or a second bar opening;
a lighting element positioned within the first channel of a first of the plurality of shelves and arranged to at least partially illuminate an object positioned the top surface of any one of the plurality of shelves; and
a plurality of containers removably disposed on the shelves and wherein the containers are coupled to an air supply.

9. The modular shelving system of claim 8, wherein the air supply is a compressed air supply.

10. The modular shelving system of claim 8, wherein, the air supply is uniformly delivered to each of the plurality of containers.

11. The modular shelving system of claim 8, further comprising a cover coupled to the first of the plurality of shelves and arranged to cover the open side of the first channel.

12. The modular shelving system of claim 8, further comprising a second lighting element positioned within the second channel of the first of the plurality of shelves and arranged to at least partially illuminate an object positioned on the top surface of a second of the plurality of shelves disposed below the first of the plurality of shelves.

13. The modular shelving system of claim 8, further comprising a heating element.

\* \* \* \* \*